United States Patent
Maruyama et al.

(10) Patent No.: US 11,437,894 B2
(45) Date of Patent: Sep. 6, 2022

(54) TOUCH SENSOR UNIT

(71) Applicant: MITSUBA Corporation, Gunma (JP)

(72) Inventors: Tsuyoshi Maruyama, Gunma (JP);
Yasuhiro Orihara, Gunma (JP); Yohei Inagaki, Gunma (JP)

(73) Assignee: MITSUBA Corporation, Gunma (JP)

( * ) Notice: Subject to any disclaimer, the term of this patent is extended or adjusted under 35 U.S.C. 154(b) by 276 days.

(21) Appl. No.: 16/815,025

(22) Filed: Mar. 11, 2020

(65) Prior Publication Data

US 2021/0006136 A1 Jan. 7, 2021

(30) Foreign Application Priority Data

Jul. 5, 2019 (JP) .............................. JP2019-125796

(51) Int. Cl.
*H02K 11/28* (2016.01)
*E05F 15/44* (2015.01)
*B60J 5/10* (2006.01)

(52) U.S. Cl.
CPC .............. *H02K 11/28* (2016.01); *E05F 15/44* (2015.01); *B60J 5/101* (2013.01); *E05Y 2400/30* (2013.01); *E05Y 2400/44* (2013.01); *E05Y 2400/52* (2013.01); *E05Y 2900/546* (2013.01)

(58) Field of Classification Search
CPC ....... B60J 5/101; E05F 15/44; E05Y 2400/30; E05Y 2400/44; E05Y 2400/52; E05Y 2900/546; H02K 11/28
See application file for complete search history.

(56) References Cited

U.S. PATENT DOCUMENTS

2018/0274269 A1* 9/2018 Orihara .................. E05B 81/78

FOREIGN PATENT DOCUMENTS

| JP | 2017204361 | | 11/2017 |
| JP | 2017204361 | A * | 11/2017 |

* cited by examiner

*Primary Examiner* — Naishadh N Desai
(74) *Attorney, Agent, or Firm* — JCIPRNET

(57) ABSTRACT

The disclosure improves the flexibility of arrangement of a separator provided at an end of a touch sensor unit to ensure electrical insulation. A sensor body included in a touch sensor unit includes a tubular insulator that is elastically deformed when an external force is applied; linear electrodes that are provided inside the tubular insulator and come into contact with each other as the tubular insulator is elastically deformed; a resistor disposed on an outer side of an end of the tubular insulator; connection wires connecting the linear electrodes and the resistor; a separator interposed between the connection wires and preventing contact between the connection wires; a mold part including at least the connection wires, the resistor, and the separator; and a cover member covering at least a part of the connection wires, the resistor, and the separator via the mold part.

4 Claims, 14 Drawing Sheets

TOUCH SENSOR UNIT

CROSS REFERENCE TO RELATED APPLICATIONS

This application claims the priority benefit of Japanese Patent Application No. 2019-125796, filed on Jul. 5, 2019. The entirety of the above-mentioned patent application is hereby incorporated by reference herein and made a part of this specification.

BACKGROUND

Technical Field

The disclosure relates to a touch sensor unit used for detecting contact with an obstacle.

Description of Related Art

A vehicle such as an automobile may be provided with an opening/closing body (for example, a sliding door or a tailgate) for opening and closing an opening of the vehicle, and an opening/closing device for driving the opening/closing body. The opening/closing device includes an electric motor which is a drive source, and an operation switch for turning the electric motor on/off. The electric motor included in the opening/closing device operates based on the operation of the operation switch, and drives the opening/closing body to open or close. Among opening/closing devices, there are automatic opening/closing devices for driving the opening/closing body to open or close regardless of whether the operation switch is operated. One of the conventional automatic opening/closing devices includes a touch sensor unit for detecting an obstacle caught between the opening and the opening/closing body, and drives the opening/closing body based on the detection result of the touch sensor unit. For example, when an obstacle is detected by the touch sensor unit, the automatic opening/closing device drives open the opening/closing body which has been driven to close, or stops it there.

An example of the touch sensor unit as described above is described in Patent Document 1 (Japanese Patent Application Laid-Open No. 2017-204361 ([0066] to [0072], FIG. 11, and FIG. 12)). The touch sensor unit described in Patent Document 1 includes a sensor body, and a sensor holder holding the sensor body. The sensor body includes an insulating tube and two linear electrodes provided in the insulating tube. Each of the linear electrodes includes a core wire (stranded wire) composed of a plurality of bundled copper wires, and a sheath composed of conductive rubber or the like and covering the core wire. The two linear electrodes constituting the sensor body are provided spirally in the insulating tube and intersect each other in a non-contact state.

The two linear electrodes provided in the insulating tube are connected in series via a resistor. Specifically, on one end side of the insulating tube, the sheath of each linear electrode is removed and a part of the core wire is exposed. Then, the exposed part of the core wire of one linear electrode is connected to one end of the resistor, and the exposed part of the core wire of the other linear electrode is connected to the other end of the resistor. In the following description, the exposed part of the core wire of each linear electrode may be referred to as a "connection wire".

A separator is disposed between the connection wires of the linear electrodes for preventing contact (short circuit) between the connection wires. The separator is formed of an insulating material, and includes a separator body and a covering part that covers the separator body. An insertion protrusion protrudes on an end of the separator body to be inserted between the two linear electrodes in the insulating tube from an end of the insulating tube. When the insertion protrusion is inserted between the two linear electrodes, the separator body is interposed between the connection wires of the linear electrodes. At the same time, at least the connection wires and the resistor are covered by the covering part. Furthermore, a formation mold part is provided on the inner side of the covering part, and the connection wires and the resistor are covered by the mold part. In other words, the connection wires and the resistor covered by the covering part are embedded in the mold part formed on the inner side of the covering part.

The sensor body that constitutes the touch sensor unit described in Patent Document 1 includes an insulating tube and two linear electrodes provided in the insulating tube. Moreover, the two linear electrodes are provided spirally in the insulating tube. Therefore, when the insulating tube and the linear electrodes are cut at any position in the longitudinal direction thereof, the positions of the linear electrodes in the circumferential direction of the insulating tube differ depending on the cutting position. That is, when the insulating tube and the linear electrodes are cut at any two or more positions in the longitudinal direction thereof, the arrangement of the two linear electrodes at each cross-section is not uniform. However, the resistor to which the connection wire of each linear electrode is connected needs to be disposed at a predetermined position in the circumferential direction of the insulating tube. Thus, the covering part of the separator, which covers the connection wires and the resistor, also needs to be disposed at a predetermined position in the circumferential direction of the insulating tube.

Therefore, Patent Document 1 describes that, after the insertion protrusion of the separator is inserted between the two linear electrodes from the end of the insulating tube, the position of the covering part is adjusted by rotating the separator in the circumferential direction of the insulating tube.

However, if the separator with the insertion protrusion inserted between the two linear electrodes is rotated in the circumferential direction of the insulating tube, a force may be applied to the linear electrodes. Then, due to the elasticity of the linear electrodes, a force is applied to the separator to rotate the separator in the reverse direction. As a result, the position of the separator may be shifted and an unexpected gap may be generated between the separator and the linear electrodes. Furthermore, if a large gap is generated between the separator and the linear electrodes, during formation of the mold part, molten resin may flow into the insulating tube from the gap and be cured in the insulating tube.

The disclosure addresses issues of the flexibility of arrangement of the separator provided at an end of the touch sensor unit to ensure electrical insulation.

SUMMARY

In one embodiment of the disclosure, a touch sensor unit is provided, including a sensor body and a sensor holder holding the sensor body. The sensor body includes: a tubular insulator housed in the sensor holder and elastically deformed when an external force is applied; a plurality of electrodes provided inside the tubular insulator and coming into contact with each other as the tubular insulator is elastically deformed; an electrical component disposed on an outer side of an end of the tubular insulator; a plurality of connection wires connecting each of the electrodes and the electrical component; an insulating member interposed between the plurality of connection wires and preventing contact between the connection wires; a mold part including at least the connection wires, the electrical component, and the insulating member; and a cover member covering at least a part of the connection wires, the electrical component, and the insulating member via the mold part.

DESCRIPTION OF THE EMBODIMENTS

Figure 1:
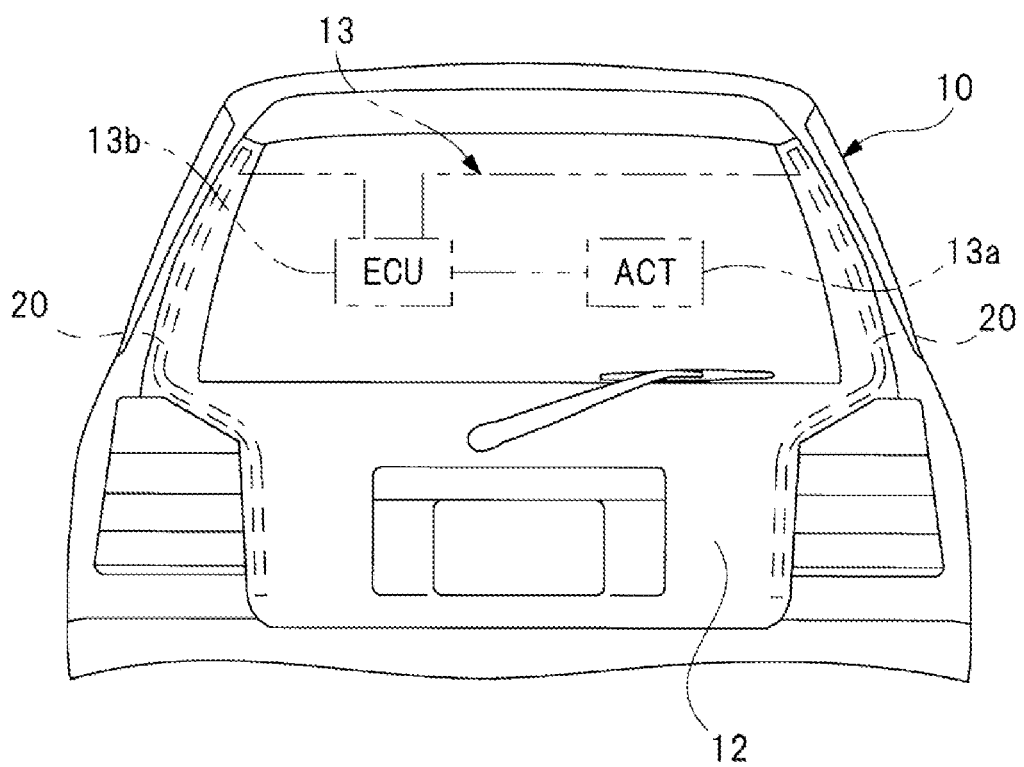
FIG. 1 is a front view showing a tailgate of a vehicle on which a touch sensor unit is mounted.
Figure 2:
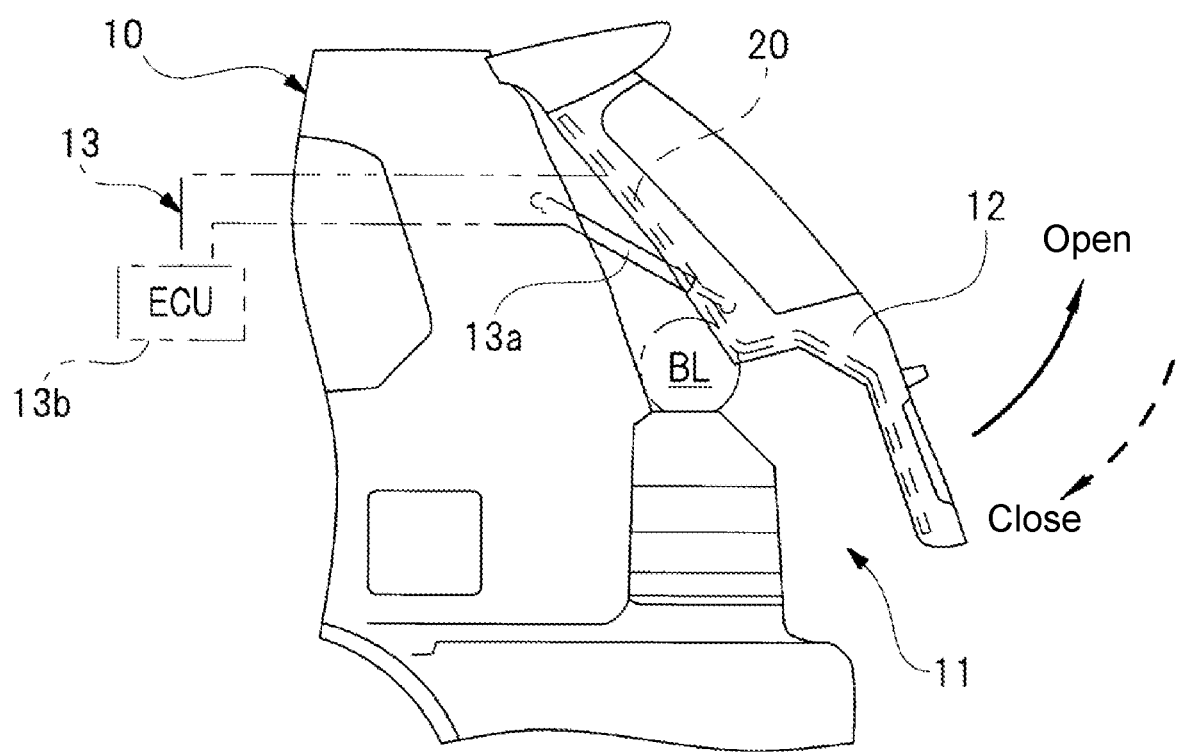
FIG. 2 is a side view showing the tailgate of the vehicle on which the touch sensor unit is mounted.

Hereinafter, an example of a touch sensor unit to which the disclosure is applied will be described in detail with reference to the drawings. As shown in FIG. 1 and FIG. 2, the touch sensor unit 20 according to the present embodiment is mounted on a vehicle 10. The vehicle 10 as shown is a so-called hatchback vehicle. The rear portion of the vehicle 10 is provided with an opening (rear opening 11) through which large luggage can be taken in and out of the vehicle interior. The rear opening 11 is opened or closed by an opening/closing body 12 that is rotatably supported by a hinge (not shown) provided on the rear side of the vehicle 10. The opening/closing body 12 is called a "tailgate", a "rear gate", a "bag door", or the like, but is referred to as "tailgate" in this specification.

The vehicle 10 is equipped with a power tailgate device 13 that rotates (opens or closes) the tailgate 12 in the directions indicated by the solid and broken arrows in FIG. 2. The power tailgate device 13 includes an actuator 13a with a speed reducer that opens or closes the tailgate 12, a controller 13b controlling the actuator 13a based on an operation of a switch (not shown), and a pair of touch sensor units 20 for detecting an obstacle BL. That is, the touch sensor unit 20 according to the present embodiment is one of the components of the power tailgate device 13 mounted on the vehicle 10.

As shown in FIG. 1, the touch sensor units 20 are provided on the outer peripheral surface of the tailgate 12. Specifically, the touch sensor units 20 are respectively provided on two side surfaces of the tailgate 12 in the vehicle width direction. More specifically, the touch sensor units 20 are provided on two curved side surfaces (edges) of the tailgate 12 along the shapes of the side surfaces. Thus, when the obstacle BL is caught between the rear opening 11 and the tailgate 12, the obstacle BL is detected by the touch sensor unit 20. The touch sensor unit 20 outputs a detection signal when detecting the obstacle BL. The detection signal output from the touch sensor unit 20 is input to the controller 13b. The controller 13b to which the detection signal is input drives open the tailgate 12 that is being driven to close, or stops the tailgate 12 that is being driven to close there regardless of the operation state of the operation switch.

Figure 3:
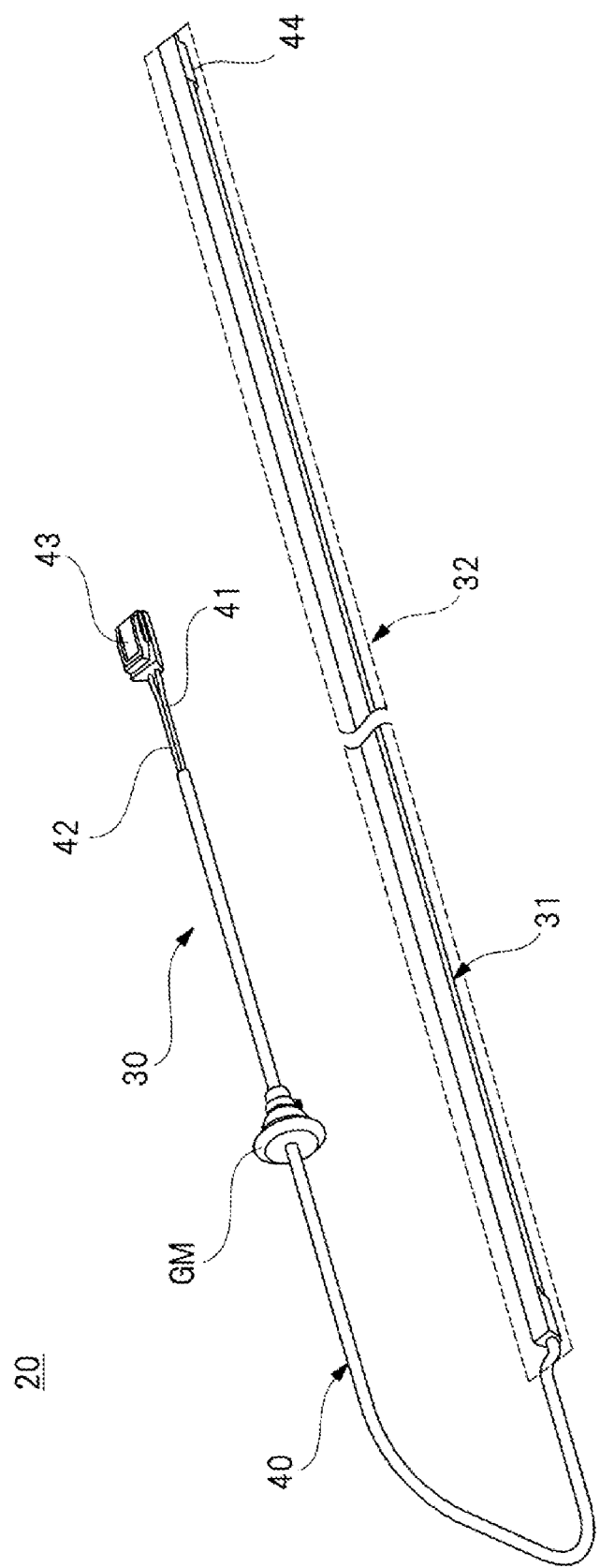
FIG. 3 is a perspective view showing a configuration of the touch sensor unit.

As shown in FIG. 3, the touch sensor unit 20 includes a sensor body 30, a sensor holder 31, and a bracket 32. The sensor body 30, the sensor holder 31, and the bracket 32 are integrated.

The bracket 32 shown in FIG. 3 is formed of a resin material such as plastic, and has substantially the same length as the side surface (edge) of the tailgate 12 (FIG. 1 and FIG. 2) and presents a plate-shaped appearance as a whole. As shown in FIG. 3, a part of the sensor body 30 in the longitudinal direction is fixed to the sensor holder 31 while the remaining part is not fixed to the sensor holder 31. Then, the sensor holder 31 to which a part of the sensor body 30 is fixed is fixed (joined) to the bracket 32. In the following description, a part of the sensor body 30 in the longitudinal direction, which is not fixed to the sensor holder 31, may be referred to as a "lead-out part" to be distinguished from other parts. However, such distinction is merely for convenience of explanation.

The touch sensor unit 20 having the basic structure as described above is attached to the vehicle 10 by fixing (joining) the bracket 32 to the edge of the tailgate 12 (FIG. 1 and FIG. 2). At this time, the lead-out part of the sensor body 30 is drawn to the inner side of the tailgate 12 from a lead-in hole provided in the tailgate 12. Further, the lead-in hole with the lead-out part drawn thereinto is closed by a grommet GM attached to the lead-out part. Hereinafter, the touch sensor unit 20 will be described in more detail.

As shown in FIG. 3, the sensor body 30 constituting the touch sensor unit 20 has a tubular insulator 40, a plurality of electrodes 41 and 42 which are provided inside the tubular insulator 40 and come into contact with each other as the tubular insulator 40 is elastically deformed, a connector 43, and a mold part 44. A part of the tubular insulator 40 in the longitudinal direction, which includes the electrodes 41 and 42 therein, is embedded in the sensor holder 31. The sensor holder 31 is formed of insulating rubber and has elasticity. That is, the sensor holder 31 is elastically deformed when an external force is applied, and returns to the original shape when the external force is removed. In addition, the connector 43 is connected to another connector (not shown). By connecting the connector 43 to another connector, the touch sensor unit 20 is electrically connected to the controller 13b (FIG. 1 and FIG. 2), allowing the detection signal output from the touch sensor unit 20 to be input to the controller 13b.

Figure 4:
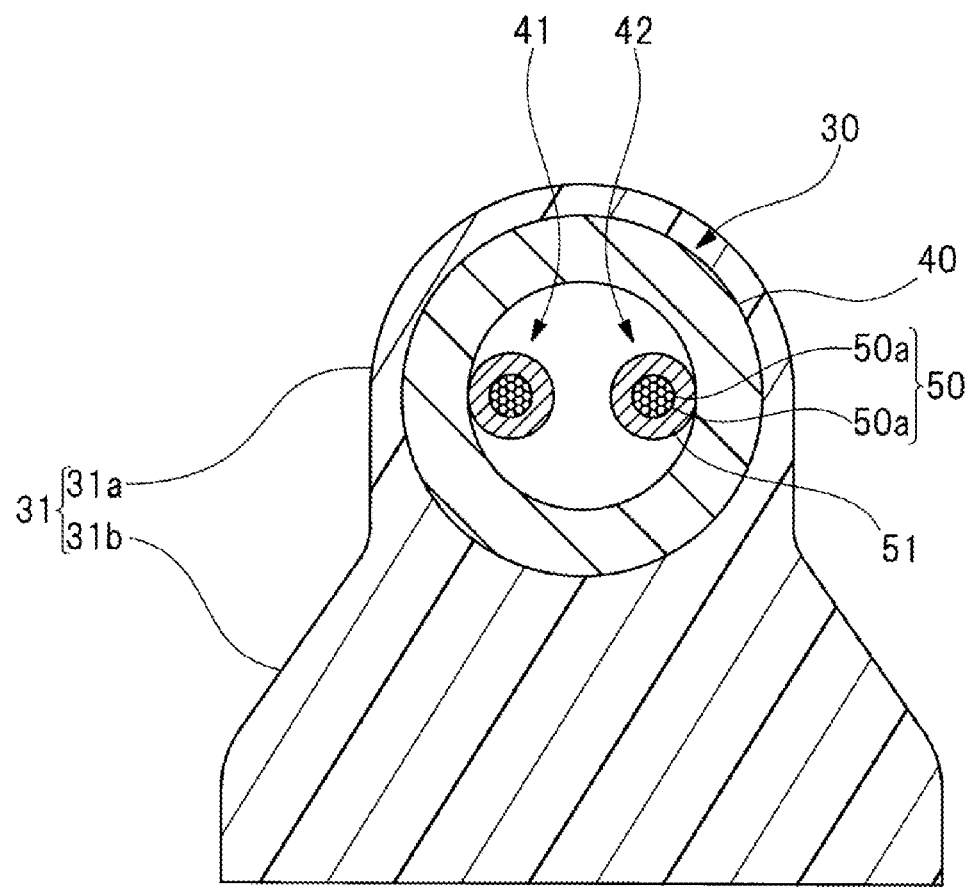
FIG. 4 is an enlarged cross-sectional view showing a structure of a sensor body and a sensor holder.

As shown in FIG. 4, the sensor holder 31 has a housing part 31a and a base part 31b that are integrally formed. The housing part 31a is hollow, and the sensor body 30 is housed in the housing part 31a and the base part 31b is joined to the bracket 32 (FIG. 3).

The tubular insulator 40 shown in FIG. 4 is a tube composed of insulating rubber and has elasticity. That is, the tubular insulator 40 is elastically deformed when an external force is applied, and returns to the original shape when the external force is removed. Further, the inner diameter of the tubular insulator 40 is about three times the outer diameter of the electrodes 41 and 42.

Figure 5:
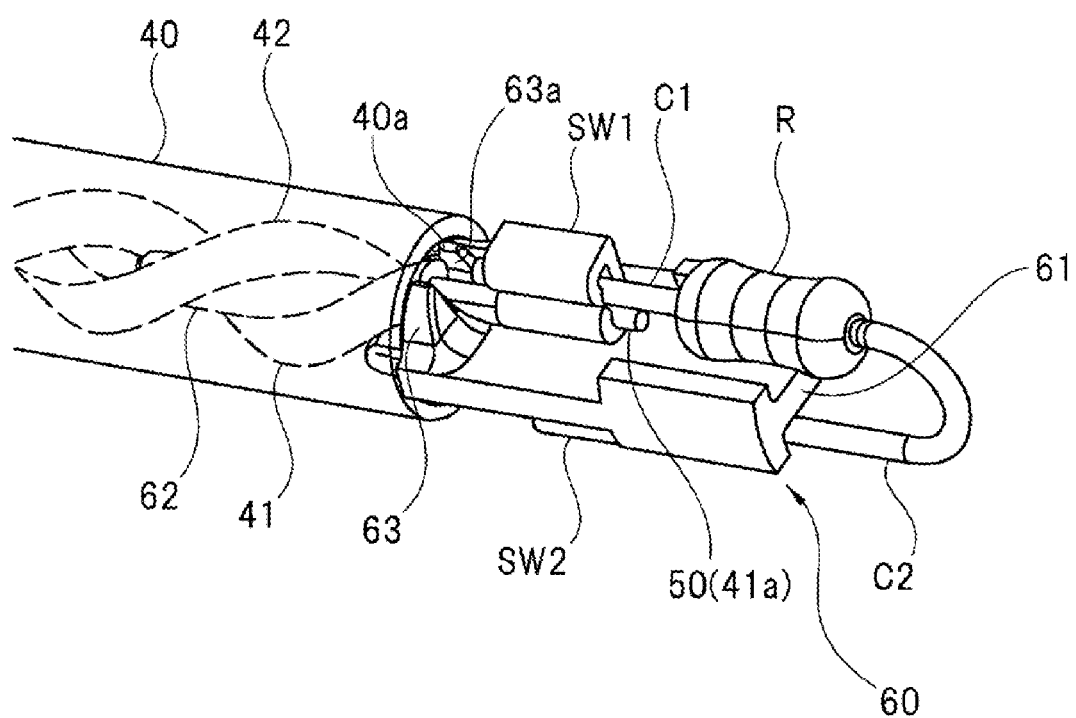
FIG. 5 is an explanatory view showing the structure of the sensor body.

As shown in FIG. 5, the electrodes 41 and 42 housed in the tubular insulator 40 are linear electrodes. The two linear electrodes 41 and 42 are provided spirally inside the tubular insulator 40, and usually, repeatedly intersect each other in a non-contact state. As shown in FIG. 4, the outer peripheral surface of each of the linear electrodes 41 and 42 is fixed (welded) to the inner peripheral surface of the tubular insulator 40, and there is a gap between the two linear electrodes 41 and 42 which is set so that another similar linear electrode may fit in.

As shown in FIG. 4, each of the linear electrodes 41 and 42 includes a core wire 50 composed of a plurality of strands 50a twisted together, and a covering layer (sheath 51) covering the core wire 50. The strand 50a in the present embodiment is a copper wire. That is, the core wire 50 in the present embodiment is a stranded wire composed of a plurality of copper wires. Further, the sheath 51 in the present embodiment is formed of a conductive resin extruded around the core wire 50.

As described above, the tubular insulator 40 that houses the linear electrodes 41 and 42 has elasticity, and the housing part 31a of the sensor holder 31 that holds the sensor body 30 including the tubular insulator 40 also has elasticity. Therefore, when the housing part 31a of the sensor holder 31 receives an external force of a certain level or more and is elastically deformed (collapsed), the external force is applied to the tubular insulator 40 accordingly. Then, the tubular insulator 40 is elastically deformed (collapsed), and the two linear electrodes 41 and 42 come close to each other and come into contact with each other in the tubular insulator 40. Specifically, the sheath 51 of one linear electrode 41 and the sheath 51 of the other linear electrode 42 come into contact with each other. As a result, the two linear electrodes 41 and 42 are electrically connected (short-circuited).

Figure 6:
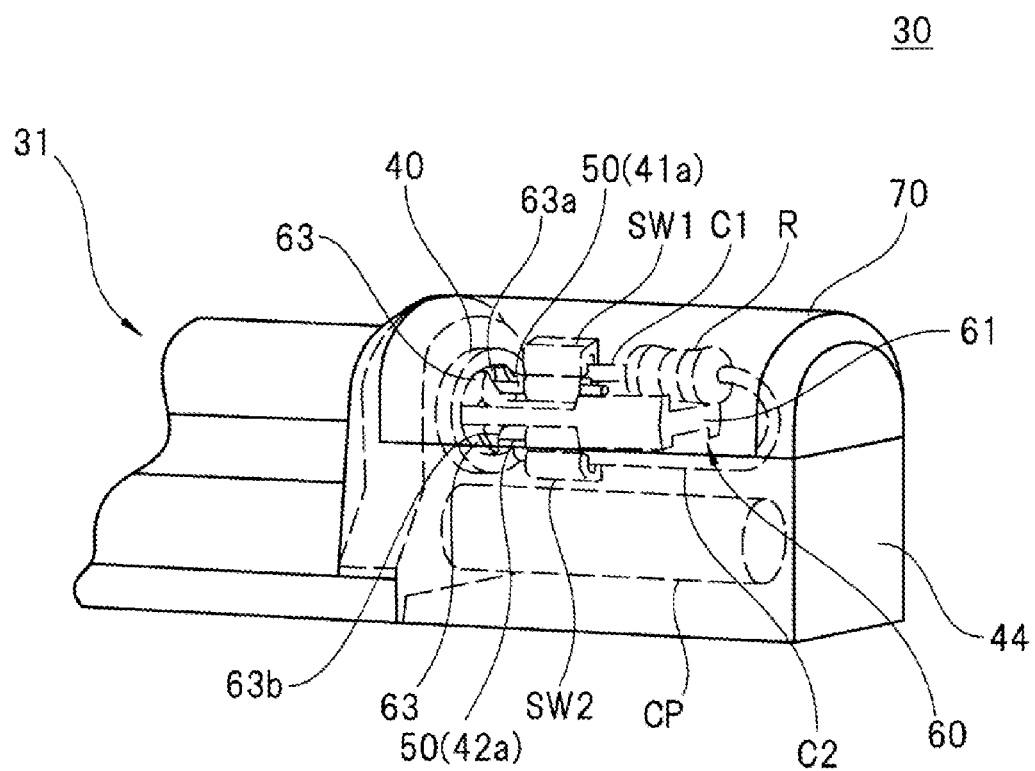
FIG. 6 is another explanatory view showing the structure of the sensor body.
Figure 7:
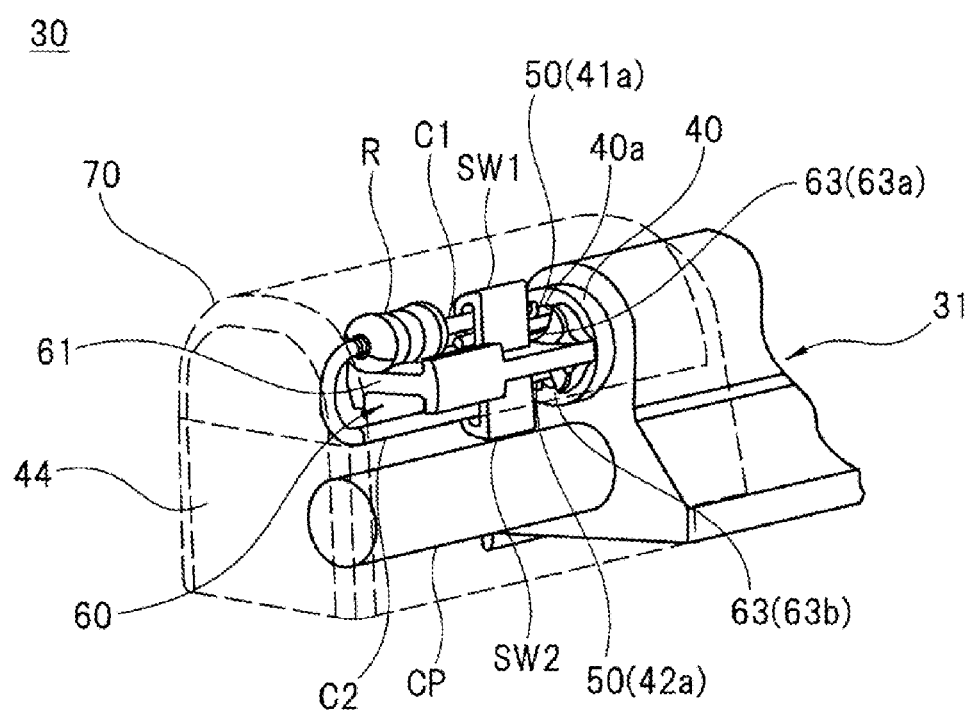
FIG. 7 is another explanatory view showing the structure of the sensor body.

As shown in FIG. 5 to FIG. 7, the core wires 50 of the linear electrodes 41 and 42 are drawn out from one opening 40a of the tubular insulator 40. Each of the two core wires 50 drawn out from the opening 40a of the tubular insulator 40 is a part of the core wire 50 exposed to the outside by partially removing the sheath 51 (FIG. 4) of the linear electrodes 41 and 42, and corresponds to the connection wire in the disclosure. Thus, in the following description, the exposed portion of the core wire 50 in the linear electrode 41 is referred to as a "connection wire 41a", and the exposed portion of the core wire 50 in the linear electrode 42 is referred to as a "connection wire 42a".

The sensor body 30 further has a resistor R as an electrical component disposed on the outer side of the end of the tubular insulator 40. One end of the resistor R is provided with a short connection part C1, and the other end of the resistor R is provided with a long connection part C2. The long connection part C2 is folded 180 degrees and is arranged in parallel to the short connection part C1. The connection wire 41a of the linear electrode 41 and the short connection part C1 are connected to each other by a connection member SW1, and the connection wire 42a of the linear electrode 42 and the long connection part C2 are connected to each other by another connection member SW2.

Figure 8:
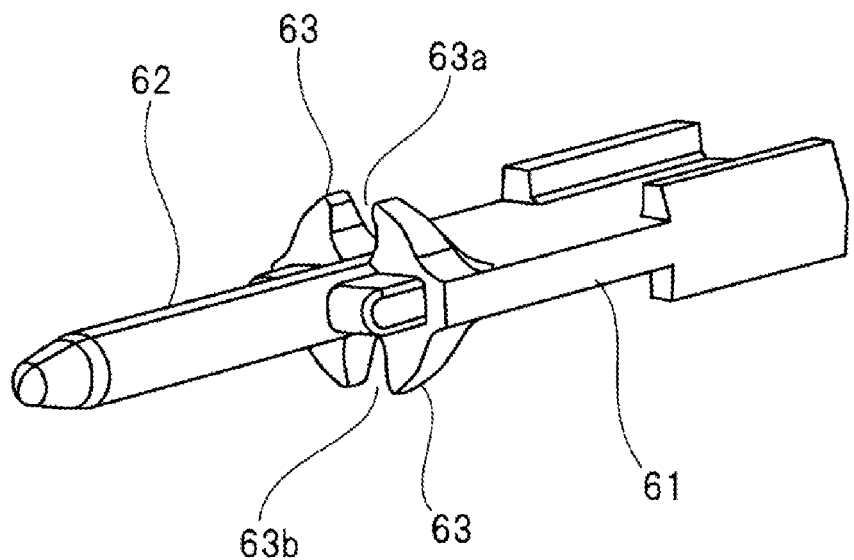
FIG. 8 is a perspective view showing a separator.

As shown in FIG. 5 to FIG. 7, the sensor body 30 further has a separator 60 as an insulating member. As shown in FIG. 8, the separator 60 has a substantially flat plate-shaped separator body 61, and a substantially columnar insertion protrusion 62 that protrudes from one end of the separator body 61 in the longitudinal direction. However, the separator body 61 and the insertion protrusion 62 are integrally formed of an insulating material such as plastic.

Figure 9:
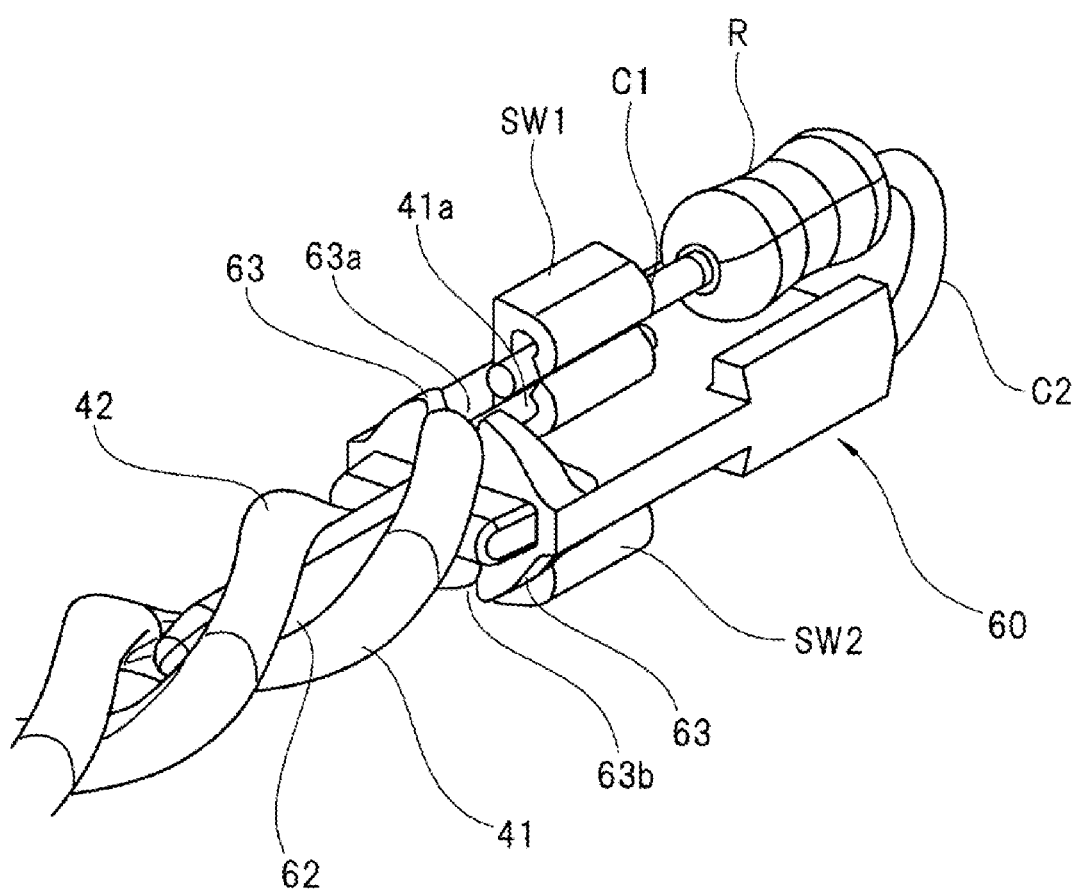
FIG. 9 is another explanatory view showing the structure of the sensor body.

As shown in FIG. 5 and FIG. 9, the insertion protrusion 62 of the separator 60 is inserted between the two linear electrodes 41 and 42 housed in the tubular insulator 40 from the opening 40a of the tubular insulator 40. Further, as shown in FIG. 5 to FIG. 7, the separator body 61 of the separator 60 is interposed between the two connection wires 41a and 42a and prevents contact (short circuit) between the connection wires 41a and 42a. Specifically, the resistor R, the short connection part C1, the connection wire 41a, and the connection member SW1 are disposed on one side (upper side) of the separator body 61, and the long connection part C2, the connection wire 42a, and the connection member SW2 are disposed on the other side (lower side) of the separator body 61.

As shown in FIG. 8, two closing parts 63 are formed at the tip of the separator body 61 so as to surround the root of the insertion protrusion 62. Then, in the center of the closing part 63 formed on the upper side of the separator body 61, a concave part 63a is provided for avoiding the connection wire 41a (FIG. 6). In the center of the closing part 63 formed on the lower side of the separator body 61, a concave part 63b is formed for avoiding the connection wire 42a (FIG. 6). The two concave parts 63a and 63b are provided at positions different by 180 degrees in the circumferential direction of the insertion protrusion 62.

As shown in FIG. 5 to FIG. 7 and FIG. 9, the connection wire 41a is drawn out on the separator body 61 through the inner side of the concave part 63a and is connected to the short connection part C1. In addition, the connection wire 42a is drawn out on the separator body 61 through the inner side of the concave part 63b and is connected to the long connection part C2. Moreover, as shown in FIG. 5 to FIG. 7, the front surfaces of the two closing parts 63 abut against the end surface of the tubular insulator 40. In other words, the insertion protrusion 62 is inserted into the tubular insulator 40 until the front surfaces of the two closing parts 63 abut against the end surface of the tubular insulator 40. As a result, the opening 40a of the tubular insulator 40 is closed by the closing parts 63. More specifically, most of the gap between the inner peripheral surface of the tubular insulator 40 and the outer peripheral surfaces of the linear electrodes 41 and 42 (sheaths 51) in the opening 40a of the tubular insulator 40 is closed by the closing parts 63.

In the following description, the connection wires 41a and 42a, the resistor R, the connection members SW1 and SW2, and the separator body 61 may be collectively referred to as an "electrical connection part". That is, the sensor body 30 has the electrical connection part provided on the outer side of the end of the tubular insulator 40.

Figure 10:
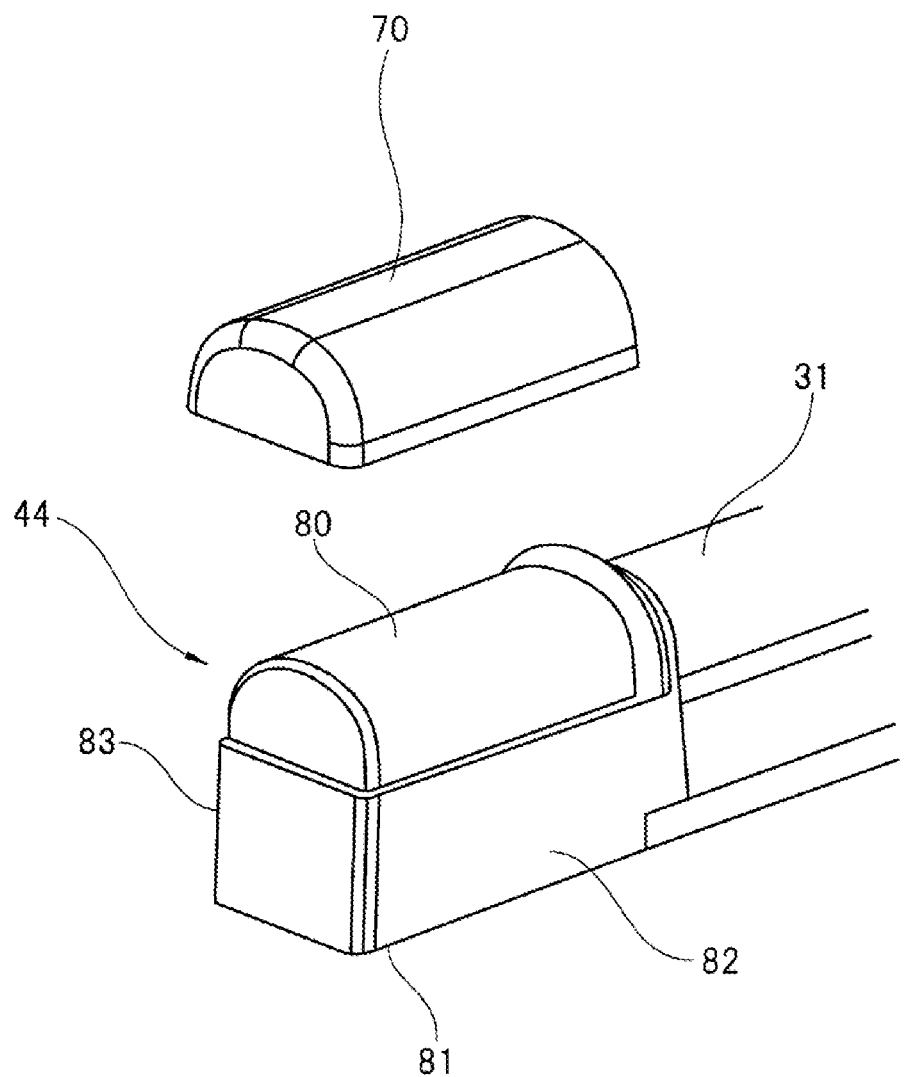
FIG. 10 is a perspective view showing a mold part and a cover member.

As described above, the mold part 44 is provided on one end side of the sensor body 30 (see FIG. 3). As shown in FIG. 6 and FIG. 7, the mold part 44 includes therein an end of the sensor holder 31, an end of the tubular insulator 40 protruding from the end, and the electrical connection part provided on the outer side of the end. Further, the mold part 44 is covered with a cover member 70 that covers at least a part of the components of the electrical connection part via the mold part 44. In other words, the cover member 70 is provided around the mold part 44 including the electrical connection part therein, and covers a part of the surface of the mold part 44. As shown in FIG. 10, the mold part 44 includes an upper surface 80 covered by the cover member 70, a bottom surface 81 located on the opposite side of the upper surface 80, and a pair of side surfaces 82 and 83 located between the upper surface 80 and the bottom surface 81.

Figure 11:
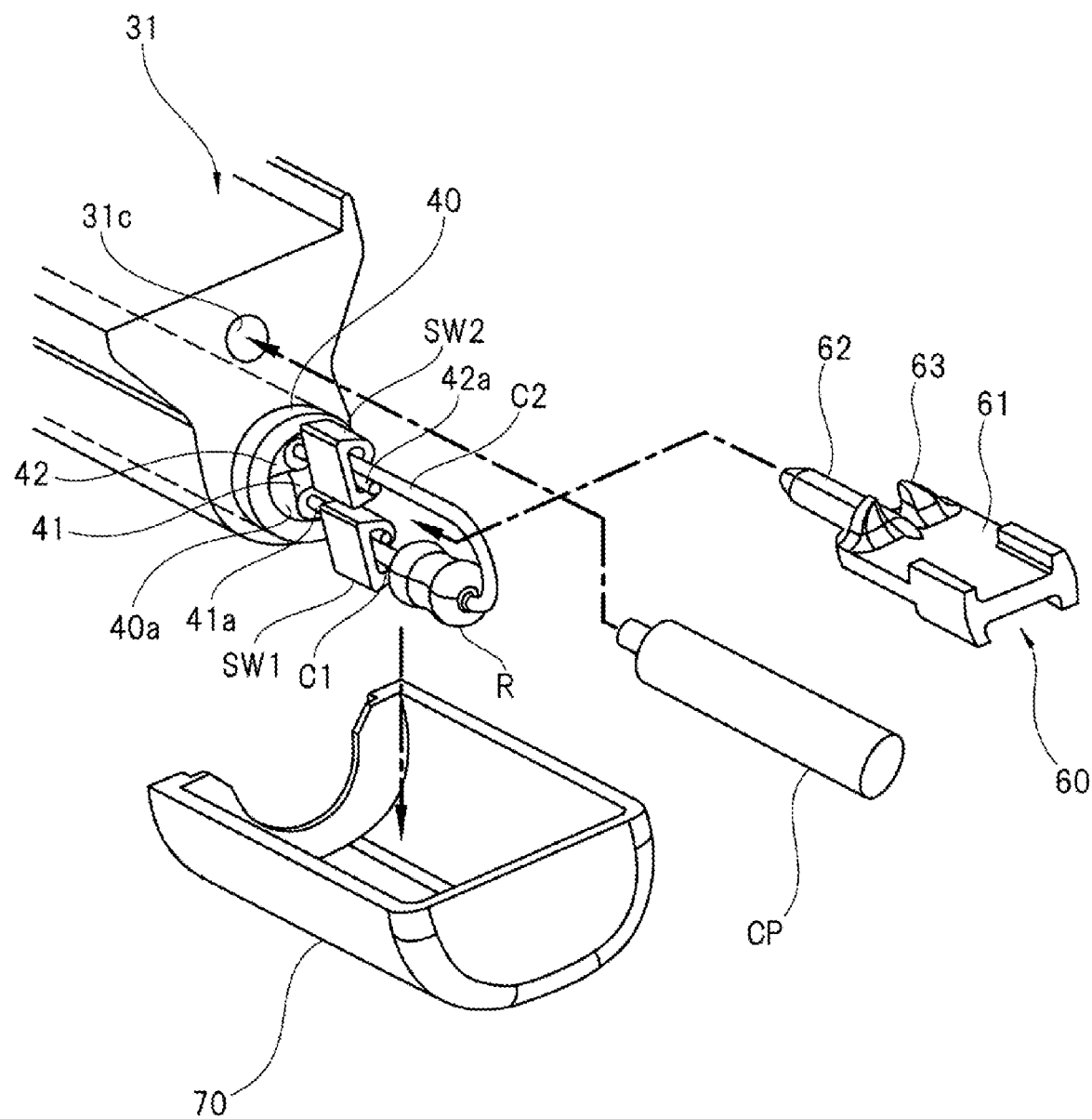
FIG. 11 is an explanatory view showing a molding process of the mold part.

The mold part 44 is a resin molded body made by injection molding using a mold. A molding process of the mold part 44 includes at least a "separator assembly process" and a "mold resin injection process". In the separator assembly process, as shown in FIG. 11, the separator 60 is arranged at a predetermined position in a predetermined direction. Specifically, the separator 60 is inserted between the body of the resistor R and the long connection part C2 so that the resistor R, the short connection part C1, the connection wire 41a, and the connection member SW1 are arranged on one side (upper side) of the separator body 61, and the long connection part C2, the connection wire 42a, and the connection member SW2 are arranged on the other side (lower side) of the separator body 61. Thereafter, the insertion protrusion 62 of the separator 60 is inserted between the two linear electrodes 41 and 42 in the tubular insulator 40 from the opening 40a of the tubular insulator 40. At this time, the insertion protrusion 62 is inserted into the tubular insulator 40 until the front surfaces of the closing parts 63 of the separator 60 abut against the end surface of the tubular insulator 40. As a result, the separator body 61 is interposed between the short connection part C1, the connection wire 41a, and the connection member SW1 and the long connection part C2, the connection wire 42a, and the connection member SW2, and prevents contact (short circuit) between these components. Further, the opening 40a of the tubular insulator 40 is closed by the closing parts 63 with substantially no gap. The tip of the insertion protrusion 62 is formed to be tapered to facilitate insertion between the linear electrodes 41 and 42. In addition, the diameter of the insertion protrusion 62 is slightly larger than the diameter of the linear electrodes 41 and 42, and enters the gap between the linear electrodes 41 and 42 while slightly pushing away the linear electrodes 41 and 42. Thus, the insertion protrusion 62 inserted between the two linear electrodes 41 and 42 does not come out accidentally.

Figure 12:
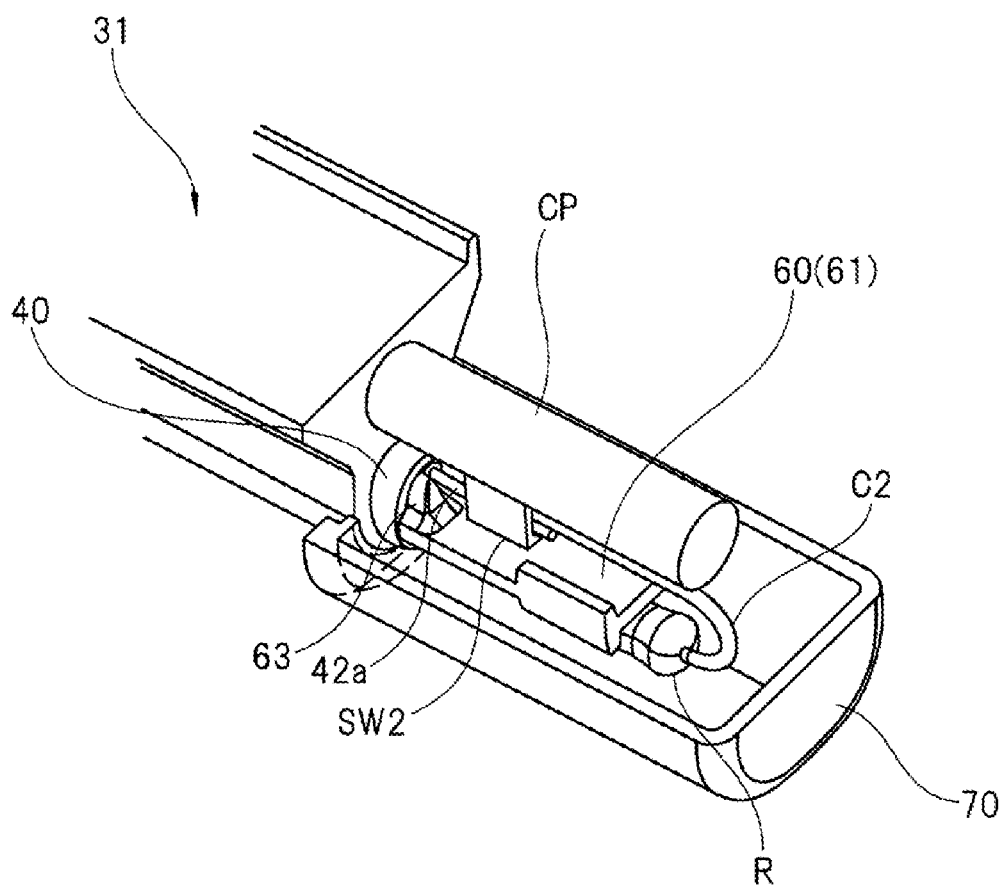
FIG. 12 is another explanatory view showing the molding process of the mold part.

In the mold resin injection process, as shown in FIG. 11 and FIG. 12, the end of the sensor holder 31, the end of the tubular insulator 40, and the electrical connection part are disposed on the inner side of the cover member 70 set in the mold (not shown). As shown in FIG. 11, an insertion hole 31c is formed in the sensor holder 31 over substantially the entire length thereof, and a core metal (not shown) is inserted into the insertion hole 31c. Therefore, a cap CP that closes the insertion hole 31c is attached to the sensor holder 31 before the mold resin injection process. Specifically, a protrusion protruding from one end surface of the cap CP is press-fitted into the insertion hole 31c. Thereby, the insertion hole 31c is closed and the mold resin is prevented from flowing into the insertion hole 31c.

Thereafter, mold resin is supplied into the mold to mold the mold part 44. At this time, the opening 40a of the tubular insulator 40 is closed by the closing parts 63 of the separator 60. Thus, the mold resin does not flow into the tubular insulator 40, and even if it flows into the tubular insulator 40, the amount is small.

Here, when the mold resin injection process is completed, the separator 60 and the cover member 70 are integrated via the mold part 44. However, the separator 60 and the cover member 70 are originally separate members and are independent from each other before the mold resin injection process. Therefore, in the separator assembly process, the separator 60 can be disposed at a predetermined position in a predetermined direction without being restricted by the position and direction of the cover member 70. That is, the assembly of the separator 60 is highly flexible. In other words, it is not required to rotate the separator 60 with the insertion protrusion 62 inserted between the linear electrodes 41 and 42 in the tubular insulator 40 in the circumferential direction of the tubular insulator 40 to adjust the position and direction of the cover member 70. Therefore, the separator 60 can be disposed at an appropriate position according to the positions of the two linear electrodes 41 and 42 in the opening 40a of the tubular insulator 40 (which differ depending on the cutting positions of the tubular insulator 40 and the linear electrodes 41 and 42). In addition, the separator 60 is not moved by the elastic restoring force of the linear electrodes 41 and 42. For example, as a result of the separator 60 being moved by the elastic restoring force of the linear electrodes 41 and 42, the opening 40a of the tubular insulator 40 may not be sufficiently closed by the separator 60 and the mold resin may flow into the tubular insulator 40. Occurrence of such a situation is easily and reliably prevented.

Figure 13A:
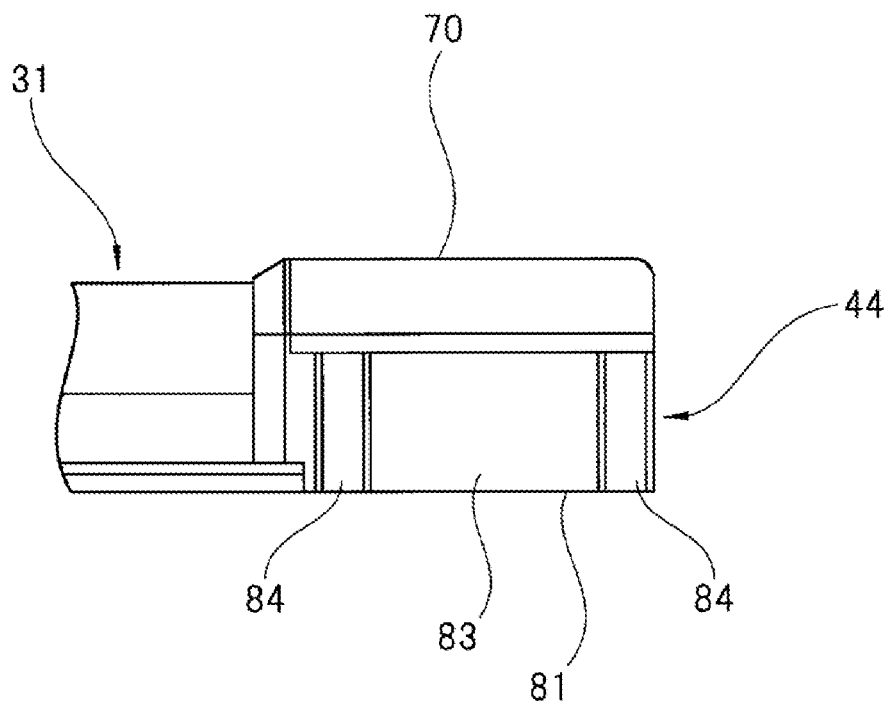
FIG. 13A is a side view showing a modified example of the mold part.
Figure 13B:
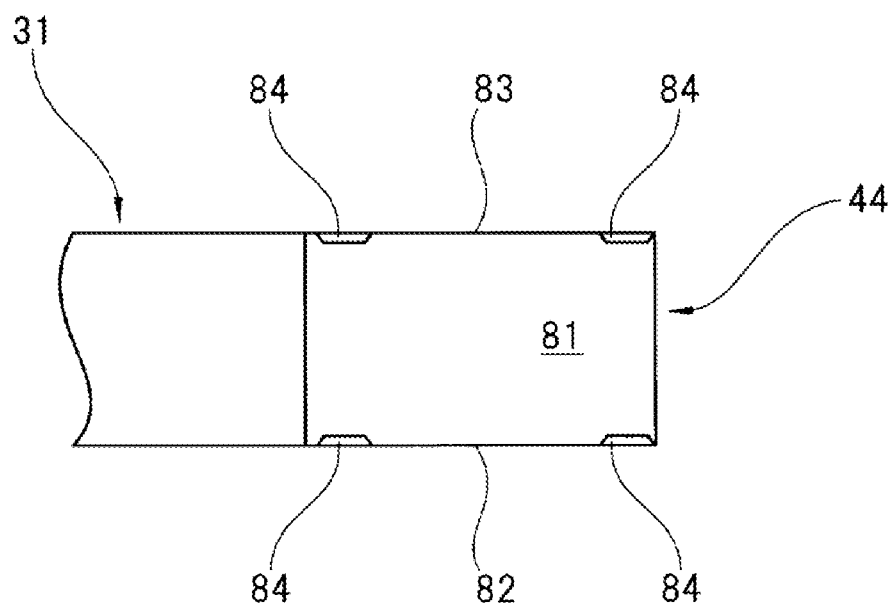
FIG. 13B is a bottom view showing the modified example of the mold part.

The disclosure is not limited to the above embodiment, and various changes can be made without departing from the scope of the disclosure. For example, in some embodiments, as shown in FIG. 13A and FIG. 13B, grooves 84 which communicate with the end surface of the cover member 70 at one end (upper end) and communicate with the bottom surface 81 of the mold part 44 at the other end (lower end) are formed on the side surfaces 82 and 83 of the mold part 44. In the example as shown, two grooves 84 are formed on each of the side surfaces 82 and 83. As shown in FIG. 3, the mold part 44 is located at one end of the touch sensor unit 20. Thus, when attaching the touch sensor unit 20 to the vehicle 10 (FIG. 1 and FIG. 2), that is, when joining the bracket 32 to the edge of the tailgate 12 (FIG. 1 and FIG. 2), the operator often grips the mold part 44 to align one end of the touch sensor unit 20. However, the mold part 44 is smaller than a standard human fingertip and is not easy to grip. The plurality of grooves 84 shown in FIG. 13A and FIG. 13B function as an anti-slip when the mold part 44 is gripped so that the operator can grip the mold part 44 easily. Further, when the grooves 84 as shown are provided on the mold part 44, the mold part 44 is formed using a mold that has convex parts corresponding to the grooves 84. That is, the above mold resin injection process is performed using a mold having convex parts corresponding to the grooves 84. At this time, by putting one end of the convex part of the mold against the end surface of the cover member 70 shown in FIG. 12, it is also possible to prevent the position of the cover member 70 in the mold from shifting.

Figure 14:
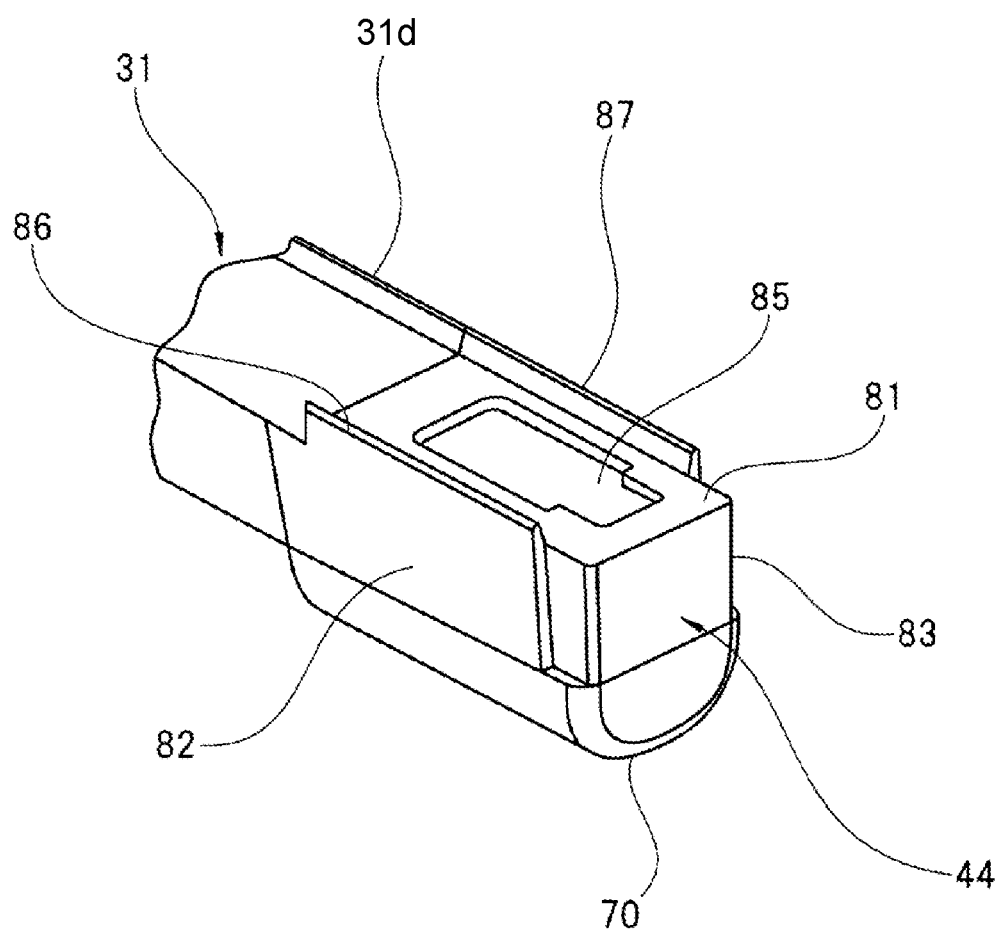
FIG. 14 is a perspective view showing another modified example of the mold part.

In some embodiments, as shown in FIG. 14, a concave part 85 is formed on the bottom surface 81 of the mold part 44. As shown in FIG. 3, the bottom surface 81 of the mold part 44 is covered by the bracket 32 at the end. Thus, by forming the concave part 85 as shown in FIG. 14 on the bottom surface 81 of the mold part 44, the amount of usage of the resin material can be reduced without impairing the appearance of the touch sensor unit 20.

In addition, a pair of protrusion parts 86 and 87 are integrally formed on the mold part 44 shown in FIG. 14.

Specifically, a pair of protrusion parts 86 and 87 protruding downward from the bottom surface 81 are provided on two sides of the bottom surface 81 in the width direction. The inner surfaces of the protrusion parts 86 and 87 face each other in the width direction of the bottom surface 81. Furthermore, the outer surface of one protrusion part 86 is flush with the side surface 82 of the mold part 44, and the outer surface of the other protrusion part 87 is flush with the side surface 83 of the mold part 44. In other words, the outer surface of the protrusion part 86 forms a part of the side surface 82 of the mold part 44, and the outer surface of the protrusion part 87 forms a part of the side surface 83 of the mold part 44.

As described above, the sensor holder 31 is joined to the bracket 32 (FIG. 3), but not only the sensor holder 31 but also the mold part 44 may be joined to the bracket 32 (FIG. 3). At this time, a series of double-sided tape is affixed from the bottom surface of the sensor holder 31 to the bottom surface 81 of the mold part 44. The protrusion parts 86 and 87 cover up the side surfaces of the double-sided tape affixed to the bottom surface 81 of the mold part 44 to enhance the aesthetic appearance of the touch sensor unit 20. In addition, a protrusion part 31*d* connected to the protrusion part 87 is integrally formed on the bottom surface of the sensor holder 31 shown in FIG. 14. The protrusion part 31*d* is also for covering up the side surface of the double-sided tape affixed to the bottom surface of the sensor holder 31 to enhance the aesthetic appearance of the touch sensor unit 20.

Other Configurations

In one embodiment of the disclosure, a touch sensor unit is provided, including a sensor body and a sensor holder holding the sensor body. The sensor body includes: a tubular insulator housed in the sensor holder and elastically deformed when an external force is applied; a plurality of electrodes provided inside the tubular insulator and coming into contact with each other as the tubular insulator is elastically deformed; an electrical component disposed on an outer side of an end of the tubular insulator; a plurality of connection wires connecting each of the electrodes and the electrical component; an insulating member interposed between the plurality of connection wires and preventing contact between the connection wires; a mold part including at least the connection wires, the electrical component, and the insulating member; and a cover member covering at least a part of the connection wires, the electrical component, and the insulating member via the mold part.

According to an embodiment of the disclosure, the cover member is provided around the mold part and covers a part of a surface of the mold part.

According to another embodiment of the disclosure, the mold part includes an upper surface covered by the cover member, a bottom surface located on an opposite side of the upper surface, and a pair of side surfaces located between the upper surface and the bottom surface. Further, a groove is formed on each of the side surfaces, in which one end of the groove communicates with an end surface of the cover member and the other end of the groove communicates with the bottom surface at the other end.

According to another embodiment of the disclosure, a concave part is formed on the bottom surface of the mold part.

According to another embodiment of the disclosure, a pair of protrusion parts protruding downward from the bottom surface are provided on two sides in a width direction of the bottom surface of the mold part. Inner surfaces of the protrusion parts face each other in the width direction of the bottom surface. In addition, an outer surface of one protrusion part is flush with one side surface of the mold part, and an outer surface of the other protrusion part is flush with the other side surface of the mold part.

The disclosure can improve the flexibility of arrangement of the separator provided at an end of the touch sensor unit to ensure electrical insulation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch sensor unit, comprising:
   a sensor body; and
   a sensor holder holding the sensor body,
   wherein the sensor body comprises:
   a tubular insulator housed in the sensor holder and elastically deformed when an external force is applied;
   a plurality of electrodes provided inside the tubular insulator and coming into contact with each other as the tubular insulator is elastically deformed;
   an electrical component disposed on an outer side of an end of the tubular insulator;
   a plurality of connection wires connecting each of the electrodes and the electrical component;
   an insulating member interposed between the plurality of connection wires and preventing contact between the connection wires;
   a mold part including at least the connection wires, the electrical component, and the insulating member; and
   a cover member covering at least a part of the connection wires, the electrical component, and the insulating member via the mold part,
   wherein the cover member is provided around the mold part and covers a part of a surface of the mold part,
   wherein the mold part comprises an upper surface covered by the cover member, a bottom surface located on an opposite side of the upper surface, and a pair of side surfaces located between the upper surface and the bottom surface,
   wherein a groove is formed on each of the side surfaces for serving as an anti-slip, wherein one end of the groove communicates with an end surface of the cover member and the other end of the groove communicates with the bottom surface.

2. The touch sensor unit according to claim 1, wherein a concave part is formed on the bottom surface of the mold part.

3. The touch sensor unit according to claim 1, wherein a pair of protrusion parts protruding downward from the bottom surface are provided on two sides in a width direction of the bottom surface of the mold part, inner surfaces of the protrusion parts face each other in the width direction of the bottom surface, an outer surface of one protrusion part is flush with one side surface of the mold part, and an outer surface of the other protrusion part is flush with the other side surface of the mold part.

4. The touch sensor unit according to claim 2, wherein a pair of protrusion parts protruding downward from the bottom surface are provided on two sides in a width direction of the bottom surface of the mold part, inner surfaces of the protrusion parts face each other in the width direction of the bottom surface, an outer surface of one protrusion part is flush with one side surface of the mold part, and an outer surface of the other protrusion part is flush with the other side surface of the mold part.

* * * * *